United States Patent Office

Re. 26,561
Reissued Apr. 15, 1969

26,561
METHOD OF MAKING MEAT CURING SALT COMPOSITIONS

Arthur E. Poarch, Mill Valley, Calif., and Michael W. Kossoy, Decatur, Ill., assignors to Western Dairy Products, Inc., San Francisco, Calif., a corporation of California No Drawing. Original No. 3,275,459, dated Sept. 27, 1966, Ser. No. 344,234, Feb. 12, 1964, which is a continuation-in-part of application Ser. No. 29,585, May 17, 1960. Application for reissue Sept. 27, 1967, Ser. No. 675,257
Int. Cl. A23b *1/01*; A23l *3/34*
U.S. Cl. 99—222 7 Claims

Matter enclosed in heavy brackets [ ] appears in the original patent but forms no part of this reissue specification; matter printed in italics indicates the additions made by reissue.

*ABSTRACT OF THE DISCLOSURE*

*A method for making a curing salt composition, suitable for the curing of meat and meat products, characterized by homogeneity of mixture, and formed of a major portion of sodium chloride and a minor portion of a curing salt, said method comprising forming a solution by dissolving the minor portion in an amount of water sufficient to fully wet but not sufficient to fully dissolve said major portion, admixing the solution with said major portion of sodium chloride and thereby forming a homogeneous paste, and heating said paste to drive off water therefrom and form a substantially dry, homogeneous mixture of sodium chloride and curing salt.*

This application for Letters Patent is a continuation-in-part of co-pending application Ser. No. 29,585, filed May 17, 1960, now abandoned.

This invention relates to the curing of meats and meat products, and more particularly to meat curing compositions and to a process of making the same.

The use of sodium nitrite and/or sodium nitrate to cure meats and meat products is a well-known and standard practice of the meat industry. These chemicals provide compounds which react with the hemoglobin of blood to provide a stable red color in the processed meat.

In commercial practice, sodium nitrite and sodium nitrate (or the potassium salts of nitrite and nitrate) are mixed with sodium chloride in order that the bulk of the mixture can be easily used by the processor. The ratios of sodium nitrite, sodium nitrate and sodium chloride may be varied depending upon the degree of curing desired and the amount of salt that is to be added to the end product. By way of illustration, 100 pounds of curing salt mixture may consist of six pounds of sodium nitrite, 4 pounds of sodium nitrate, and 90 pounds of sodium chloride.

If sodium nitrite, sodium nitrate and sodium chloride, each in granular or pulverized form, are compounded by mechanical mixing, there is no assurance that the amount of nitrite from a portion of the mixture in the top of the container will be the same as the nitrite concentration in the product from the bottom of the container, it being well-known that crystalline or pulverized chemicals of different types often cannot be mechanically mixed to result in an absolutely homogenous product.

Also, the transportation of mechanically mixed curing salt products from the point of preparation to the place of use often entails a considerable amount of shaking and vibration. This aggravates the problem by increasing the rate of sifting action to result in the concentration of one or more of the components of the product at either the top or the bottom of the shipping container. The degree of sifting is not predictable, being dependent upon the particle sizes of the various constituents, their relative densities, the amount and type of vibrational forces, and the container configuration.

In the meat industry it is not usual for the processor to use curing salts in single container increments. It is the usual practice for the processor to remove, say, 5 to 10 pounds of curing salt from a large container of curing salt product for the preparation of a single lot of pumping pickle or as a direct additive to a batch of comminuted meat, such as sausage. If the product has shifted, the first increment removed from the container will be different in composition from the last portion removed, and hence the meat processor may either undercure his meat product or add nitrite and/or nitrate in excess of the legal limit (200 parts of nitrite ($NO_2$) per million parts of final processed meat product). Either situation can result in a considerable loss of product to the meat processor.

The prior art has suggested ways of overcoming the separation problem in a curing salt mixture. This prior art comprises U.S. Patents 2,054,623 and 2,054,624. The solutions therein proposed to this separation problem are on the one hand, a complete fusing of the mass of sodium nitrite, sodium nitrate and sodium chloride, and, on the other hand, a fusing of the nitrites or nitrates into the physical structure of the salt crystals or globules. In fusing the nitrites or nitrates into the physical structure of the salt crystals, a water solution of sodium chloride and the sodium or potassium salts of nitrous or nitric acids, or both, is flash dried on the surface of a heated drum, removed from the drum by a knife blade, cooled, and packaged. The process takes advantage of the lower melting point of a eutectic mixture of the salts and the true melting point of the pure salts alone.

In connection with this prior art proposal, it has been observed by selected staining and microscopic examination of the end product that not all of the nitrite and nitrate is trapped within the salt crystals. An appreciable amount of free nitrite and nitrate is present, and it is apparent that there likewise exists a percentage of pure salt crystals that contain no nitrite or nitrate. Closer study of this prior art process and product reveals that each crystal of salt does not necessarily contain sodium nitrate and/or nitrite in the same proportion as is present in the original water solution of the 3 salts involved. In fact, the final product consists of free salt, free sodium nitrate, free sodium nitrite, and a heterogeneous mixture of fusing product combinations, of 2 or more of the salts present in the original water solution. It follows that this known prior art process is only a partial answer to the problem of preventing the separation of the components of the cure salt formulation. It is still possible for one or more of the constituents to be mechanically separated from the body of the cure salt by vibration or handling of the final package. This drum fusion process is, however, an improvement over a mechanically mixed cure salt.

The process of flash drying a water solution of the curing salts is a rather expensive method. Sodium chloride is soluble up to a maximum of about 40 parts in 100 parts of hot water (2:5); sodium nitrite is soluble in the amount of about 163 parts in 100 parts of hot water; and sodium nitrate is soluble to the extent of about 180 parts in 100 parts of hot water. It may be seen that the amount of sodium chloride in the curing salt is the limiting factor in reaching the maximum solids content of the solution of salt to be drum dried.

The essential object of the present invention is to provide a method of producing a curing salt mixture, the end product of which method is novel and consists of an intimate, non-separating mixture of fused nitrate, nitrite and sodium chloride.

A further object of the present invention is to provide a curing salt mixture production method which is more economical to practice than the drum or flash methods above described.

Other objects and advantages of the invention will be apparent from the following description constituting the specification of the invention.

In accordance with the method of the present invention, a water solution is formed by dissolving 6 grams of sodium nitrite and 4 grams of sodium nitrate in 30 grams of water, the water being at about room temperature. The resulting solution is added to 90 grams of sodium chloride which has been pulverized to substantially pass through a 325 mesh sieve. The combined materials are then mixed together so as to completely wet the sodium chloride with the nitrate and nitrite solution and to form a heavy paste of almost dough-like consistency. The paste is then evenly spread on the surface of a metal sheet to form a layer of about ½" in thickness. The metal sheet bearing the salt paste is then placed in a heater atmosphere of about 330° F. and allowed to remain in this atmosphere until the entire salt mass reaches 330° F. The dried salt mass is then removed from the heated atmosphere, cooled to about 200° F., and crushed to the desired particle size.

The process may be practiced on either a batch basis or a continuous production basis.

The specific proportions given in the above example are not to be considered limiting, as the constituents may be combined in any relative proportion in which they provide a usable curing salt mixture. Also, the given particle size for the sodium chloride is not to be considered limiting. Any particle size may be selected. It is desirable, however, that the particles be relatively small and that they be fairly uniformly sized.

The amount of water employed should be at least sufficient to entirely wet the sodium chloride but less than that required to fully dissolve the sodium chloride, with the minimal amount of water being preferred because of the lesser expense involved in driving it off. 30 parts of water is the least amount of water which can be used to fully wet 90 parts of sodium chloride. The ratio here varies somewhat with the particle size of the salt. For instance, if 200 mesh sodium chloride were used, only 25 parts of water would be required to insure complete wetting of 90 parts of the sodium chloride.

The 330° F. temperature given in the foregoing example is the eutectic reaction isotherm for [a] *the given* mixture of sodium nitrite, sodium nitrate and sodium chloride. The important point here is that whatever mixture is selected for the end product, the wetted sodium chloride is to be heated until it attains [this] *the* eutectic reaction isotherm *of the mixture selected.*

The wetted sodium chloride should be maintained relatively quiescent until it has reached the fusing temperature.

Upon microscopic examination of the cooled, crushed salt mixture, and through the use of selective staining methods to distinguish between sodium nitrite, sodium nitrate and sodium chloride, an unusual and novel product is apparent. The surfaces of the sodium chloride crystals are randomly covered by a plurality of small sodium nitrite-nitrate particles fused thereon. In some instances, two or more salt crystals are joined by small fused particles of the nitrite-nitrate bodies. In no instances of examination have there been observed what are described in the aforementioned prior art patents as heart-shaped nitrite-nitrate interiors of a larger sodium chloride crystal or particle.

The following is believed to be an accurate explanation of what takes place during the process to provide the end product described:

As previously stated, the amount of water employed to make the paste is sufficient to completely dissolve the sodium nitrite and sodium nitrate but quite insufficient to completely dissolve the sodium chloride. During the wetting of the latter, each undissolved salt particle is completely surrounded by a film of water in which is dissolved sodium chloride, sodium nitrite and sodium nitrate. When sodium chloride of a relatively narrow range particle size is used, each salt particle will have associated with it a given quantity of sodium nitrite and sodium nitrate in water solution.

When the paste is heated, the water progressively evaporates, and the sodium chloride that was dissolved from the salt particle surfaces during the step of preparing the paste recrystallizes onto the surface of the undissolved salt present. Further and final evaporation of the water causes the sodium nitrite and sodium nitrate to crystallize and cause the resulting crystals to be deposited on the surface of each of the sodium chloride particles.

Continued heating of the mass to a temperature above the eutectic reaction isotherm of sodium chloride and sodium nitrite or of sodium chloride and sodium nitrate causes the contacting surfaces of the sodium chloride and the nitrate or nitrite (both, if both are present) to melt. As the temperature is then decreased below the eutectic reaction isotherm, the eutectic composition which is present solidifies and acts as a cement to hold the nitrite or nitrate particles to the sodium chloride crystals.

The eutectic cement bond between the sodium chloride and the nitrate or nitrite particles appears to be quite strong. Careful crushing of the bonded mass of the cured salt mixture does not result in the dislodgment of any appreciable quantity of nitrate or nitrite particles from the sodium chloride crystal surfaces.

Since substantially all of the nitrite and nitrate particles are bonded to sodium chloride crystals in a ratio which is approximately that of the original mixture, no separation can occur. In other words, any aliquot portions of a quantity of this cure salt mixture will have a consistent chemical analysis. It is therefore possible to provide a meat processor with a cure salt mixture that contains the same amounts of nitrite and nitrate for each pound of product used at all times. Furthermore, there is no sifting or segregation of one or more of the cure salt components when the commercial, packaged product is vibrated during transit.

The economies offered by the subject method in comparison with the prior art methods earlier described are apparent from a mere comparison of the water removal problem involved. In the present case the production of 100 parts of finished curing salt mixture requires that only 30 parts of water be evaporated. When the drum flash crystallization method is used, at least 250 parts of water must be evaporated for each 100 parts of cure salt produced.

It is of course to be understood that potassium nitrite and potassium nitrate may be employed in place of sodium nitrite and sodium nitrate. One or the other of nitrite and nitrate salts may be employed in combination with sodium chloride, or a combination of nitrite and nitrate salts may be employed with sodium chloride. Whatever the combination and identity of curing salt constituents, the wetted sodium chloride is to be heated to the eutectic reatcion isotherm of the mixture of salts selected.

What is claimed is:

1. A method for making a curing salt composition for the curing of meat and meat products comprising fully dissolving in a predetermined amount of water an amount of salt selected from the group of salts consisting of the nitrite and nitrate salts of sodium and potassium, homogeneously mixing the resulting solution with substantially uniformly sized sodium chloride particles, said resulting solution being present in an amount sufficient to fully wet the sodium chloride but insufficient to fully dissolve said sodium chloride, thereby forming a homogeneous paste, raising the temperature of the mixture to its eutectic reaction isotherm, and cooling said mixture to a temperature below said eutectic reaction isotherm.

2. The method of claim 1 including cooling said mixture to about 200° F. and crushing said cooled mixture to a particle size condition.

3. A method for making a curing salt composition for the curing of meat and meat products comprising dissolving in 30 parts by weight of water 6 parts by weight of sodium nitrite and 4 parts by weight of sodium nitrate, homogeneously mixing the resulting solution with 90 parts by weight of sodium chloride particles to form a homogeneous paste, raising the temperature of said mixture to about 330° F., and cooling said mixture to a temperature below 330° F.

4. The method of claim 3, said mixture being cooled to about 200° F., and said mixture being thereafter crushed to a particle size condition.

5. A method for making a curing salt composition for the curing of meat and meat products comprising fully dissolving in water a salt selected from the groups of salts consisting of the nitrite and nitrate salts of sodium and potassium, mixing the resulting solution with sodium chloride particles to form a homogeneous mixture, the parts by weight ratio of the solvent or water phase of said resulting solution to said sodium chloride being within the range of about 1:3 to less than 5:2, said homogeneous mixture thereby being a paste, heating said mixture to drive off the water and to raise the temperature of the resulting residue to the eutectic reaction isotherm of the salts constituting said residue, and cooling said residue to a temperature below said eutectic reaction isotherm.

6. The method of claim 5 including cooling said residue to about 200° F. and crushing the cooled residue to a particle size condition.

*7. A method for making a curing salt composition for the curing of meat and meat products comprising fully dissolving in a predetermined amount of water an amount of salt selected from the group of salts consisting of the nitrite and nitrate salts of sodium and potassium, homogeneously mixing the resulting solution with substantially uniformly sized sodium chloride particles, said resulting solution being present in an amount sufficient to fully wet the sodium chloride but insufficient to fully dissolve said sodium chloride, thereby forming a homogeneous paste, and heating said paste to drive off the water and form a homogeneous mixture of sodium chloride and selected salt.*

References Cited

The following references, cited by the Examiner, are of record in the patented file of this patent or the original patent.

UNITED STATES PATENTS 2,054,625 9/1936 Griffith ---------- 99—222

LIONEL M. SHAPIRO, *Primary Examiner.*

U.S. Cl. X.R.

99—159